United States Patent
Dykstra et al.

(10) Patent No.: US 9,286,391 B1
(45) Date of Patent: Mar. 15, 2016

(54) CLUSTERING AND RECOMMENDING ITEMS BASED UPON KEYWORD ANALYSIS

(75) Inventors: Aaron James Dykstra, Federal Way, WA (US); Saurabh Nangia, Seattle, WA (US); Stephen B. Ivie, Bothell, WA (US); David Michael Hurley, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 334 days.

(21) Appl. No.: 13/424,144

(22) Filed: Mar. 19, 2012

(51) Int. Cl.
*G06F 17/30* (2006.01)

(52) U.S. Cl.
CPC .... *G06F 17/30864* (2013.01); *G06F 17/30616* (2013.01); *G06F 17/30705* (2013.01)

(58) Field of Classification Search
CPC ............... G06Q 30/02; G06Q 30/0631; G06F 17/30864; G06F 17/2247; G06F 17/2785; G06F 17/30616; G06F 17/2229; G06F 17/271; G06F 17/277; G06F 17/30539; G06F 17/30684; G06F 17/3071; G06F 17/30867
USPC ......... 707/737, 708, 722, 739, 748, 750, 767, 707/768, 752.767
See application file for complete search history.

(56) References Cited

U.S. PATENT DOCUMENTS

| | | | |
|---|---|---|---|
| 6,853,982 B2 * | 2/2005 | Smith et al. | 705/26.7 |
| 7,574,422 B2 * | 8/2009 | Guan et al. | 707/999.001 |
| 8,015,140 B2 * | 9/2011 | Kumar et al. | 706/46 |
| 8,065,298 B2 * | 11/2011 | Chen et al. | 707/726 |
| 8,145,638 B2 * | 3/2012 | Mount et al. | 707/737 |
| 8,200,672 B2 * | 6/2012 | Adachi et al. | 707/739 |
| 8,234,285 B1 * | 7/2012 | Cohen | 707/749 |
| 8,275,673 B1 * | 9/2012 | Poon et al. | 705/26.7 |
| 8,332,333 B2 * | 12/2012 | Agarwal | 706/12 |
| 8,468,048 B2 * | 6/2013 | Agarwal et al. | 705/14.26 |
| 8,484,228 B2 * | 7/2013 | Bhattacharyya et al. | 707/754 |
| 8,732,173 B2 * | 5/2014 | Mizuguchi et al. | 707/737 |
| 2003/0115191 A1 * | 6/2003 | Copperman et al. | 707/3 |
| 2006/0100963 A1 * | 5/2006 | Leurs et al. | 705/51 |
| 2008/0243637 A1 | 10/2008 | Chan et al. | |
| 2010/0010987 A1 * | 1/2010 | Smyth et al. | 707/5 |
| 2011/0179114 A1 * | 7/2011 | Dilip et al. | 709/204 |
| 2013/0132364 A1 * | 5/2013 | Udupa et al. | 707/709 |
| 2013/0132381 A1 * | 5/2013 | Chakrabarti et al. | 707/730 |
| 2013/0275511 A1 | 10/2013 | Wilson et al. | |

* cited by examiner

*Primary Examiner* — Dangelino Gortayo
(74) *Attorney, Agent, or Firm* — Sutherland Asbill & Brennan LLP

(57) ABSTRACT

A multi-level approach for generating suggestions and/or recommendations associated with one or more items is provided. A group of related items may be identified, for example, by generating a collaborative filtering graph or other graph that includes items and connections between the items. Description data associated with items included in the group may be evaluated in order to determine respective keywords associated with the items and/or a list of common keywords representative of the group of items or a subset of the group of items. Based at least in part upon the list of common keywords, at least one suggestion may be generated.

29 Claims, 7 Drawing Sheets

CLUSTERING AND RECOMMENDING ITEMS BASED UPON KEYWORD ANALYSIS

CROSS-REFERENCE TO RELATED APPLICATION

The present application is related to U.S. patent application Ser. No. 13/424,140, entitled "Hybrid Recommendation Systems and Methods" and filed on Mar. 19, 2012, the contents of which are incorporated by reference herein in their entirety.

BACKGROUND

Many websites provide product and/or item recommendations to users based on purchases, views, and/or other online activity. For example, a website may recommend an item in a catalog to a user based on an item previously purchased by that user or another user. However, for some websites, the number of items available in the catalog may be large and consistently growing. As such, techniques for recommending items may become cumbersome and/or unmanageable. Additionally, techniques for grouping items in a catalog or determining topics for a catalog may become cumbersome and time-consuming. For example, when using latent Dirichlet allocation ("LDA") to sort the items in a catalog, a relatively large effort may be expended on optimizing the number of topics to use for an LDA analysis. Therefore, finding improved ways to cluster, group, and/or recommend items continues to be a priority.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
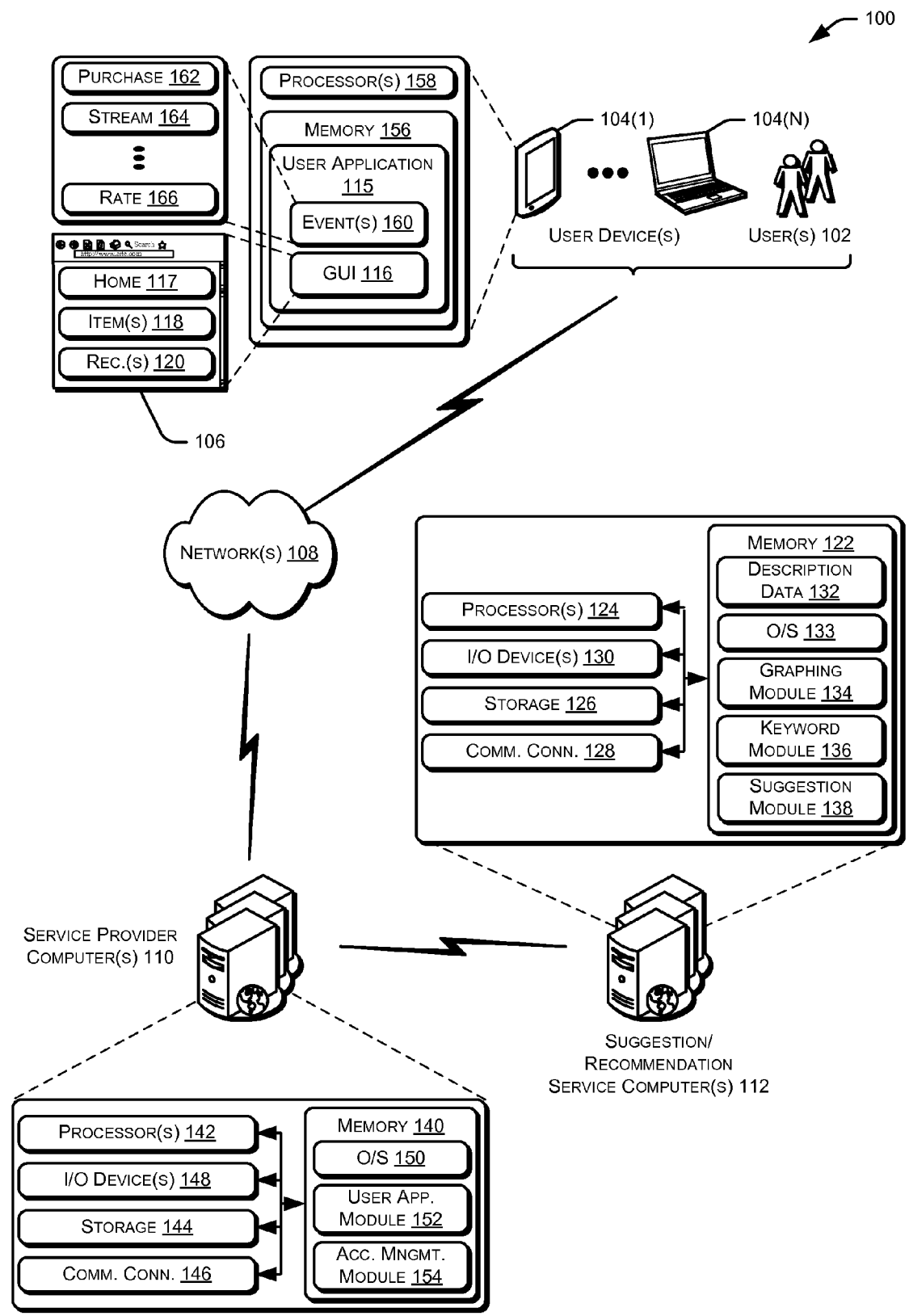
FIG. 1 illustrates an example architecture for evaluating items and making suggestions based upon keyword analysis.

Embodiments of the present disclosure are directed to, among other things, providing suggestions associated with any number of related items. Example suggestions include clustering suggestions, topic suggestions, and/or recommendations for items (e.g., recommendations for similar items, etc.). In one example embodiment, one or more groups of related items may be determined or identified. A wide variety of suitable techniques may be utilized to identify one or more groups of related items. For example, a collaborative filtering graph, a content-based graph, a hybrid graph, or other graph may be generated that includes items and connections, such as co-occurrences, between the items. One or more subsets of the items may then be identified from the graph utilizing any number of suitable algorithms, such as a multi-hop, shortest path algorithm. As another example, one or more groups of related items may be determined based upon an analysis of received item indications associated with a consumer, such as item selections, item ratings, item views, etc. In this regard, a group of related items relevant to the consumer may be identified.

In some examples, a content-based graph may be generated. In a content-based graph, nodes of a graph may represent items while edges may represent content-based similarities between the nodes. For example, in a content-based graph, inherent properties such as, but not limited to, catalog data, item names, and/or item properties (e.g., the director, the manufacturer, etc.) may be utilized to determine item similarities. These similarities (e.g., a similarity score) may determine the edge properties of the graph. In other examples, a collaborative filtering graph may be generated. In this example, edges of the graph may represent connected node similarities based on behavior patterns of users and/or secondary entities. For example, in a collaborative filtering graph, behavior patterns such as, but not limited to, item purchases, item views (e.g., streaming video content), item clicks, item ratings or reviews, and/or other actions may be utilized to determine the graph's edge properties. In yet another example, a hybrid graph may be generated and/or provided wherein some or both the content-based techniques and the collaborative filtering techniques may be utilized to generate a recommendation graph.

Once one or more groups of related items have been identified, any number of suitable information extraction and/or information retrieval techniques, such as latent semantic analysis ("LSA"), term frequency-inverse document frequency ("TF-IDF") analysis, heuristic information extraction algorithms, and/or data-driven information extraction algorithms, may be utilized to evaluate description information associated with the items. In this regard, respective keywords may be extracted and/or determined for each of the related items. Additionally, one or more respective lists of common keywords that are representative of each of the groups of related items may be determined. The list(s) of common keywords may then be utilized to make a wide variety of different types of suggestions, such as clustering suggestions, suggestions for topics associated with the items, and/or recommendations of similar items.

As one example use case, collaborative filtering (or another suitable technique) may be utilized to build a graph of items associated with an electronic catalog, along with connections (e.g., co-occurrences, etc.) associated with the items. Various subsets or clusters of the graph may be identified, for example, by utilizing a multi-hop, shortest path algorithm. Respective common lists of keywords may then be determined for each of the subsets. For example, 10 to 20 common keywords may be determined for each of the subsets. A total number of identified common keywords may then be calculated. For example, if 10 respective common keywords are determined for 9 groups of items, then 90 total keywords may be identified. The total number of keywords may then be utilized to determine a number of topics or groups to be evaluated during the performance of a clustering technique, such as a latent Dirichlet allocation ("LDA"), on the electronic catalog. For example, if an LDA analysis will result in the identification of 10 keywords per topic, then the total number of identified keywords may be evaluated in order to determine that nine topics should be utilized for an LDA analysis.

In a similar manner, a graph of consumers or users may be generated. In other words, the items in a graph may be representative of users, and various connections between the users (e.g., similar purchases, similar reviews, connections via social media, etc.) may be represented. Description information associated with the users (e.g., profile information, browsing history information, etc.) may then be evaluated in order to determine common keywords associated with any number of groups of consumers. A number of topics or groups to be evaluated in association with a clustering technique may then be determined.

As another example use case, information associated with items identified by a consumer may be collected and/or determined. For example, as a consumer browses and/or searches through an electronic catalog, information associated with items that are viewed, rated, selected, and/or purchased by the consumer may be collected. A common set of keywords may then be determined for the items, and a topic that the customer is interested in may be determined for making suggestions and/or recommendations based at least in part upon an analysis of the common set of keywords. In certain instances, the topic may be determined based upon an intersection between topics in which the items are classified. For example, a consumer may view a snowboard that is classified in a sporting goods category, a pair of snowboard shoes classified in a shoe category, and a ski jacket classified in an outerwear category. Based upon an evaluation of a list of common keywords associated with the items, a determination may be made that the consumer is interested in a snowboard category. Recommendations of similar items within the snowboard category may then be generated and presented to the consumer.

Additionally, in certain embodiments, an evaluation of keywords may be utilized to make suggestions associated with new items, such as new items to be added to an electronic catalog (or suggestions associated with a new user or consumer). For example, a description for a new item may be evaluated in order to determine keywords associated with the new item. The keywords for the new item may then be compared to respective lists of keywords associated with groups of items (e.g., subsets of a graph, etc.) included in the electronic catalog. Based upon determined correspondences and/or similarities between the keywords for the new item and the keywords associated with other items, one or more topics and/or categories that best fit the new item may be determined. Recommendations of similar items and/or other suggestions may then be made based at least in part upon the determined topics and/or categories. In this regard, recommendations and/or suggestions may be made for new items without waiting to collect historical information (e.g., viewing information, rating information, purchase information, etc.) associated with the new items.

This brief introduction, including section titles and corresponding summaries, is provided for the reader's convenience and is not intended to limit the scope of the claims, nor the preceding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

FIG. 1 depicts an illustrative system or architecture 100 in which techniques for providing suggestions based at least in part upon keyword analysis may be implemented. In architecture 100, one or more users 102 (e.g., account holders, guest users, etc.) may utilize user computing devices 104(1)-(N) (collectively, user devices 104) to access at least one website 106, or a user account accessible through the website 106, via one or more networks 108. In some aspects, the website 106 and/or user account may be hosted, managed, and/or provided by a service provider, such as by utilizing one or more service provider computers 110. Additionally, in some aspects, one or more suggestions/recommendation service computers 112 may be in communication with the service provider computers 110 to provide item recommendation services, topic suggestion services, and/or graph suggestion services for the service provider computers 110. It should be understood that any functionality described herein may be provided by any of these devices and/or computers, especially by way of the service provider computers 110 and/or the suggestion/recommendation service computers 112. Additionally, as desired, the service provider computers 110 and suggestion/recommendation service computers 112 may be the same computers.

In some examples, the networks 108 may include any one or a combination of multiple different types of networks, such as cable networks, the Internet, wireless networks, cellular networks, and other private and/or public networks. While the illustrated example represents the users 102 accessing the website 106 over the networks 108, the described techniques may equally apply in instances where the users 102 interact with a service provider computer 110 via the one or more user devices 104 over a landline phone, via a kiosk, or in any other suitable manner. It is also noted that the described techniques may apply in other client/server arrangements (e.g., set-top boxes, etc.), as well as in non-client/server arrangements (e.g., locally stored software applications, etc.). Additionally, certain suggestions may be made by the suggestion/recommendation service computers 112 in the absence of user interaction with the service provider computers 110. For example, historical information associated with previous user interactions may be evaluated in order to make certain suggestions, such as a suggestion for a number of topics to utilize for a clustering technique (e.g., an LDA analysis, etc.).

As described briefly above, the website 106 may allow the users 102 to interact with a service provider computer 110, such as to interact with other users, purchase goods and/or services, and/or to access various user accounts hosted by or provided by the service provider computer 110 and associated with the user 102. In some instances, a user 102 may access the website 106 without logging in, such as when browsing and/or reading general content, when reviewing public profiles of other users, or when searching for items or content to purchase, download, consume, etc. However, in other instances, the service provider computer 110 may request that the user 102 log in to perform specific requests such as, but not limited to, posting comments, interacting and/or connecting with other users, changing user information, purchasing items and/or services, streaming or otherwise viewing items, adding items to a wish list or shopping cart, checking-out, accessing private account holder information, or the like.

With continued reference to FIG. 1, one or more service provider computers 110, perhaps arranged in a cluster of servers or as a server farm, may host the website 106. Other server architectures may also be used to host the website 106. The website 106 may be capable of handling requests from many users 102 and serving, in response, various user interfaces that can be rendered at the user devices 104. The website 106 can be any type of website that supports user interaction, including social networking sites, online retailers, informational sites, blog sites, search engine sites, news and entertainment sites, and so forth. As discussed above, the described techniques can similarly be implemented outside of the website 106.

In some examples, the website 106 may host a social networking platform for interacting with other users and/or sharing items. Additionally, the website 106 may host an electronic catalog that may include one or more items. An item may include anything that the website 106 offers for viewing, sharing, purchasing, renting, subscribing to, informing, or for some other form of consumption. In some embodiments, the item may be offered for consumption by the website 106, while in other embodiments, the website 106 may host items that others are offering using the website 106. An item can further include a product, a service, a user account, user information, a digital download, a news clip, customer-created content (e.g., a customer review) or information (e.g., a customer name), some other type of sellable or non-sellable unit, or any combination or bundle of the foregoing or the like. In some embodiments, an item can also include a user or entity (e.g., a docent, a recommended expert, a professional, a band, an artist, a publisher, etc.), a user's or entities attributes, promotions associated with a user or entity, one or more websites, and/or links associated with a user or entity, one or more browse nodes, and/or various content associated with a user or entity.

In some examples, a user 102 may log in or otherwise enter a session. The log-in may be based on receipt of log-in credentials such as a user identifier ("ID") and/or a password. However, in some examples, the service provider may utilize cookies or some other state-verifying technique to determine that a user 102 is still logged in or was last logged in from the same computing device such as, but not limited to, user device 104. Alternatively, or in addition, a user 102 may maintain a session over multiple log-ins, using multiple different user devices 104, and/or over a period of time that may be longer than a typical web browser session. In some aspects, the suggestion/recommendation service computers 112 may be configured to keep track of actions, events, and/or occurrences associated with one or more session IDs, user IDs, web sessions, log-in sessions, and/or user accounts. As such, in some examples, the actions, events, and/or occurrences of a user 102 (or multiple users) may be utilized to generate a content-based graph, a collaborative filtering graph, a hybrid graph, a subset graph, and/or any number of suggestions for the user 102 and/or suggestions based upon actions taken by multiple users.

In one non-limiting example, a user 102 may access a website 106 via a user application 115 of at least one of the user devices 104. In some aspects, the user application 115 may be a Web browser, a mobile application, a dedicated application, or any way of accessing the website 106. As such, the user application 115 may provide and receive hypertext markup language ("HTML") requests and responses from a server, such as the service provider computers 110. In some examples, the website 106 may be hosted by the service provider computers 110 or any other Web server. The user 102 may be presented with a graphical user interface ("GUI") 116 that may provide a home screen 117, where the user 102 may interact with items 118, user profiles, digital content, products, services, information, etc., of the website 106. Further, the GUI 116 may be configured to display one or more recommendations 120 to the user. As noted above, a recommendation is one example suggestion that may be generated, and a recommendation may be one or more similar items provided in direct, or near direct, response to an action of the user 102, or it may be a recommendation based on aggregated history and/or preferences of the user 102 such as, for example, on a home screen, a checkout page, a product category page, or the like.

As noted above, the architecture 100 may include one or more suggestion/recommendation service computers 112. The suggestion/recommendation service computers 112 may include any type of computing devices such as, but not limited to, mobile, desktop, thin-client, server, and/or cloud computing devices. In operation, a suggestion/recommendation service computer 112 may be configured to execute computer-executable instructions in order to form a special-purpose computer or particular machine that facilitates graphing, keyword analysis, and/or suggestion services. In some examples, the suggestion/recommendation service computers 112 may be in communication with the service provider computers 110 via the networks 108, or via other network connections. In certain embodiments, the suggestion/recommendation service computers 112 may include one or more servers, perhaps arranged in a cluster, as a server farm, or as individual servers not associated with one another. These servers may be configured to host, receive, store, and/or process graph requests, keyword analysis requests, and/or suggestion requests from the one or more service provider computers 110. Additionally, these servers may be configured to host, receive, store, and/or process suggestion requests for providing a suggestion service. As noted above, in some instances, this service may be performed for, or at the request of, the service provider computers 110. Additionally, in some aspects, various services may be separate and distinct from one another (and/or implemented on different machines by different providers), while in other aspects, the various services may be provided by a single suggestion/recommendation service computer 112 and/or may be integral to the service provider computer 110. For example, the suggestion/recommendation service computers 112 may be included with the service provider computers 110 in a single, integrated, distributed computing environment such that the host of the website 106 performs graphing, keyword analysis and/or suggesting on its own.

In one illustrative configuration, the suggestion/recommendation service computers 112 may include at least one memory 122 and one or more processing units (or processor(s)) 124. In some examples, the processor(s) 124 of the suggestion/recommendation service computers 112 may be implemented as appropriate in hardware, software, firmware, or combinations thereof. Various implementations of the processor(s) 124 may include computer-executable or machine-executable instructions written in any suitable programming language to perform the various functions described.

The memory 122 may store program instructions that are loadable and executable on the processor(s) 124, as well as data generated during the execution of these programs. Depending on the configuration and type of suggestion/recommendation service computers 112, the memory 122 may be volatile (such as random access memory ("RAM")) and/or non-volatile (such as read-only memory ("ROM"), flash memory, etc.). The suggestion/recommendation service computers 112 or servers may also include additional storage 126, which may include removable storage and/or non-removable storage. The additional storage 126 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 122 may include multiple different types of memory, such as static random access memory ("SRAM"), dynamic random access memory ("DRAM"), or ROM.

The memory 122 and the additional storage 126, both removable and non-removable, are all examples of computer-readable storage media. For example, computer-readable storage media may include volatile and non-volatile, removable and non-removable media implemented in any method or technology for storage of information such as computer-readable instructions, data structures, program modules, or other data. The memory 122 and the additional storage 126 are all examples of computer storage media.

The suggestion/recommendation service computers 112 may also contain communications connection(s) 128 that allow the suggestion/recommendation service computers 112 to communicate with stored databases, other computing devices or servers, user terminals, and/or other devices on the networks 108. The suggestion/recommendation service computers 112 may also include input/output ("I/O") device(s) 130, such as a keyboard, a mouse, a pen, a voice input device, a touch input device, a display, speakers, a printer, etc., that facilitate user interaction with the suggestion/recommendation service computers 112.

Turning to the contents of the memory 122 in more detail, the memory 122 may include a wide variety of description data 132 and/or other stored data (e.g., data files, profile information, etc.), an operating system ("OS") 133, and one or more application programs or services for implementing the features disclosed herein, including a graphing module 134, a keyword module 136, and/or a suggestion module 138. The description data 132 may include a wide variety of data associated with any number of items including, but not limited to, item feature information, item detail information, item description information, item tag information, item review information, item rating information, user profile information, etc. In certain embodiments, the description data 132 may include textual description data for any number of items. The description data 132 may be obtained from any number of suitable sources, such as item manufacturers, merchants, distributors, wholesalers, and/or the service provider computers 110. In addition to storing description data 132, in certain embodiments, historical information associated with events, actions, and/or other user interactions with various items may be stored. Indeed, a wide variety of information associated with items may be stored in the memory 122. The OS 133 may include one or more suitable applications and/or program modules that facilitate the general operation of the suggestion/recommendation service computers 112, as well as the execution of one or more of the additional application programs.

In some aspects, the graphing module 134 may include any number of suitable applications and/or modules configured to receive information associated with items and/or interactions with items such as, but not limited to, events, actions, and/or occurrences by a user during a session or associated with a session ID. For example, actions may include purchasing an item, viewing an item (e.g., streaming a video), rating an item (e.g., providing a numeric or other score for a product or user), reviewing an item (e.g., providing a textual review), clicking on a link to an item, adding an item to a "wish list," adding an item to a shopping cart, combinations of the foregoing or the like. Additionally, the graphing module 134 may be configured to receive additional information associated with each of the aforementioned actions. For instance, the time associated with each action may aid in determining the time distance of each event and, hence, the relative similarity of the items involved. Similarly, geographic information associated with the actions as well as action types (or event types) may aid in determining the relevancy of one action in relation to another.

In some examples, this item information may be stored or otherwise recorded in the memory 122 or another memory location and be utilized to generate a graph, where each node of the graph represents each item (or product ID) that is associated with actions or events taken by users 102, and each edge represents one or more co-occurrences between two items. A wide variety of different types of graphs may be generated by the graphing module 134, such as a collaborative filtering graph, a content-based graph, or a hybrid graph. Additionally, the graphs may be generated from actions or events associated with single users or combinations of users.

As one example of generating a graph, a user 102 may purchase a camping grill and click on a sleeping bag during one web session (signified by a session ID, which may be identified by a cookie stored on the user device 104) and then the following week, the user 102 may purchase the sleeping bag and a tent (in some examples, still part of the same session ID). In this example, the graphing module 134 may receive this information and generate a collaborative filtering graph that includes the grill, the sleeping bag and the tent, with each item represented as a node. Additionally, in this example, edges may be added to the graph to bridge the nodes with co-occurrences, such that an edge may exist between the grill and the sleeping bag (based on the co-occurred views on the first day) and between the sleeping bag and the tent (based on the co-occurred purchases the following week). Over time, a graph associated with a particular session ID, user 102, customer ID, or other entity may grow rather dense and include tens, hundreds, or even thousands of items with co-occurred events. Additionally, in some aspects, the edges may indicate a co-occurrence count that identifies a number of co-occurred actions between particular items. In this way, certain edges may be weighted higher than others based, in part, on the number of co-occurred events. For example, if movie one and movie two are both streamed twice in a month, while movie three is only streamed once, the edge between the nodes representing movie one and movie two may indicate a count of two, while the edge between the nodes representing movie one and movie three (and/or between movie two and movie three) may only indicate a count of one. Additionally, edges may be further weighted by factoring, multiplying, or otherwise changing the count based on the type of event that co-occurred, the geographic location of the event that co-occurred, or the time distance between the events. For example, and not by way of limitation, purchasing an item may create a higher weighting factor than viewing the item (e.g., purchasing a DVD rather than streaming the movie) in order to indicate that the user 102 valued the movie more and wishes to view it multiple times. As such, a count of one may be factored to ten (in some examples) when the movie was purchased, while a count of one may only be factored to five (in some examples) when the movie was viewed. Further, in some examples, temporal and geographic information may further weight the edges indicating that items purchased in certain areas may be more similar to other items purchased in that area and/or indicating that items purchased more recently may be more similar to other items also purchased recently.

Additionally, in some examples, graphs may utilize cross-customer co-occurrence information and/or social media information to further bridge product IDs and to generate more dense graphs. For example, a user 102 may indicate that another user is a "friend," or is otherwise affiliated with the user 102, and co-occurrence information between the two users may be branched together into a single graph. Additionally, in some aspects, social media websites may be mined for information to add additional nodes and/or edges to a graph of a user 102. For example, the graphing module 134 may receive information from a stream associated with a social media website of the user 102 when items that share occurrences with graph items of the user 102 are mentioned by other users. In other embodiments, graphs may be generated based upon actions and/or events associated with unrelated users 102 or with users that the service provider computers 110 and/or the suggestion/recommendation service computers 112 determine to be associated or similar.

Although a collaborative filtering graph is described above, in other embodiments, a content-based graph may be generated. In a content-based graph, nodes of a graph may represent items while edges may represent content-based similarities between the nodes. For example, in a content-based graph, inherent properties such as, but not limited to, catalog data, item names, and/or item properties (e.g., the director, the manufacturer, etc.) may be utilized to determine item similarities. These similarities (e.g., a similarity score) may determine the edge properties of the graph. In yet other embodiments, a hybrid graph may be generated that includes both collaborative filtering and content-based similarities between nodes.

In some aspects, once a graph is generated and edges are formed and/or weighted, the graphing module 134 may generate a subset graph for a wide variety of different purposes. For example, a subset graph may be generated in order to lessen the computations required to generate similarity scores between various node pairs. As another example, the graphing module 134 may also receive information associated with an action of the user 102, such as a click or view of an item. The graphing module 134 may then use that click as a starting point on the graph and determine a distance, k, from the starting point to begin generating the subset graph. That is, the graphing module 134 may generate the subset graph by traversing the original graph up to k nodes away from the starting point, and eliminating nodes outside the distance k. As such, a multi-hop, shortest distance algorithm may be employed such as, but not limited to, Floyd-Warshall's algorithm, the Bellman Ford algorithm, Dijkstra's algorithm, or some other algorithm for determining all nodes within a particular shortest distance (i.e., k nodes from the starting point). Further, in some aspects, k may be a constant, or it may be a variable that is determined based on product category and/or domain space. As desired, the subset graph may be utilized to generate one or more suggestions based upon a keyword analysis.

As another example of generating subset graphs, one or more clusters of items included in a generated graph may be generated, for example, based upon a multi-hop, shortest distance algorithm. In this regard, a graph may be divided into any number of clusters for subsequent keyword analysis. Any number of items may be included in a cluster, such as 10, 20, or 30 items. Additionally, the number of items to be included in a cluster may influence the results and/or operations of an algorithm utilized to select items for a cluster.

The memory 122 may also include a keyword module 136, which may include any number of suitable applications and/or modules configured to perform keyword analysis on various items and/or groups of items. In operation, the keyword module 136 may identify an item or a group of related items for purposes of performing a keyword analysis. A wide variety of suitable techniques may be utilized to identify an item or a group of related items. As one example, one or more items associated with user events (e.g., selections, clicks, views, ratings, purchases, reviews, etc.) may be identified during a session or across multiple sessions. In certain embodiments, the items may be identified based upon the generation of a collaborative filtering graph or based upon another collaborative filtering technique. As another example of identifying a group of related items, a graph or a subset of a generated graph (e.g., a content-based graph, a collaborative filtering graph, a hybrid graph, etc.) may be identified. In certain embodiments, multiple groups or clusters of related items may be identified from a generated graph. As yet another example of identifying a relevant item, a new item to be added to an electronic catalog may be identified.

Once one or more groups of related items have been identified, respective description data 132 associated with each of the items may be accessed from memory 122 or obtained from any number of data sources or other components of the architecture 100. Any number of suitable information extraction techniques and/or evaluation techniques, such as latent semantic analysis ("LSA"), heuristic information extraction algorithms (e.g., a term frequency-inverse document frequency ("TF-IDF") analysis, etc.) and/or data-driven information extraction algorithms, may then be utilized to evaluate the description information 132. In this regard, respective keywords may be extracted and/or determined for each of the related items. In certain embodiments, one or more terms and/or phrases included in the description data 132 for an item may be weighted for purposes of determining keywords for the item. Additionally, one or more identifiers may be located and utilized to identify certain words and/or phrases to be weighted. For example, when evaluating a movie, terms and/or phrases that specify a genre for the movie may be weighted. Similarly, when evaluating an apparel item, terms and/or phrases that specify, define, or describe a style for the item may be weighted. Additionally, in certain embodiments, certain terms that commonly appear in the description data 132, such as "a," "the," and/or other relatively common terms, may be filtered from the keyword identification analysis.

Additionally, one or more respective lists of common keywords that are representative of each of the groups of related items may be determined. Any number of suitable evaluation techniques, such as a TF-IDF analysis and/or other suitable information extraction and/or evaluation techniques (e.g., heuristic information extraction algorithms, data-driven information extraction algorithms, etc.), may be utilized to determine a list of common keywords for a group. In certain embodiments, shared keywords between the various items included in a group may be identified. For example, a list of keywords for each item in a group may be compared in order to determine a list of common keywords for the group. In other embodiments, description data 132 for multiple items may be evaluated utilizing a TF-IDF analysis (or other suitable analysis) in order to identify keywords that are shared across the various items of the group. As desired, certain terms in the description data 132 for the items may be weighted during the analysis. Additionally, in certain embodiments, commonly appearing terms may be filtered from the analysis.

An example TF-IDF analysis may determine a number of times that various terms appear in description data 132 for an item. A term frequency may be determined from the number of times that a term appears compared to a total number of terms in a document. For example, if a particular term appears three times in a 100 word document, then the term frequency may be calculated as (3/100) or 0.03. Additionally, the TF-IDF analysis may determine a number of documents (e.g., description documents for various items) in which various terms appear. An inverse document frequency may be calculated from the number of documents in which a term appears. For example, if a term appears in 10 out of 250 documents, then the inverse document frequency may be determined as the log (250/10) or approximately 1.4. A TF-IDF score for a term may then be determined based upon the term frequency and the inverse document frequency. Utilizing the example above, a TF-IDF score for a term may be calculated as the product of the term frequency and the inverse document frequency. In other words, a TF-IDF score of 0.042 may be determined for a term. In certain embodiments, TF-IDF scores may be evaluated in order to determine or identify common keywords or terms that are representative of a group of items.

Additionally, in certain embodiments, the TF-IDF scores for various keywords may be evaluated in order to determine whether identified groups of items are actually related items. For example, if TF-IDF scores associated with the keywords of the various items do not satisfy one or more threshold values, then a determination may be made that the items should not be considered related items. In other words, if the description data 132 for various items does not include a sufficient number of shared terms, then a determination may be made that the items should not be considered related items. In this regard, clusters and/or groupings of items may be evaluated and, as desired, new clusters and/or groupings may be formed.

Although a TF-IDF analysis has been described for evaluating keywords and/or description data 132, a wide variety of other types of textual evaluation techniques may be utilized to analyze description data. The TF-IDF analysis has been described for illustrative purposes only.

Once a list of common keywords has been determined or identified for a group of related items, the list of common keywords may be utilized to generate or make a wide variety of different types of suggestions, such as clustering suggestions, suggestions for topics associated with the items, and/or recommendations of similar items. With continued reference to FIG. 1, the memory 122 may also include a suggestion module 138. In some aspects, the suggestion module 138 may be configured to provide suggestions and/or recommendations to the service provider computers 110 (e.g., a suggestion of a number of topics to use for a clustering analysis, etc.) and/or to a user 102 based on actions or events (e.g., based on viewing, rating, purchasing, etc.) associated with items. In certain embodiments, the suggestion module 138 may be configured to generate suggestion based at least in part upon identified keywords. As desired, the suggestion module 138 may also utilize purchase history or other historical information during the generation of suggestion. For example, the suggestion module 138 may be configured to provide a suggestion (i.e., a list of similar items, a topic that the user 102 may be interested in, etc.) to a user 102 in response to an action or event. In other examples, the suggestion may be a general suggestion based on habits, likes, or past purchases, or other historical and/or aggregated information regarding the user 102.

A wide variety of different types of suggestions may be generated as desired by the suggestion module 138. In certain embodiments, the suggestion module 138 may evaluate respective lists of common keywords associated with various groups of items in order to determine a number of topics to be utilized for a clustering technique, such as an LDA analysis, a canopy clustering technique, a hierarchical clustering technique (agglomerative, divisive, etc.), a centroid-based clustering technique (e.g., k-means clustering, etc.), a distribution-based clustering technique (e.g., Gaussian distribution, etc.), a density-based clustering technique (e.g., density-based spatial clustering of applications with noise ("DB-SCAN"), ordering points to identify the clustering structure ("OPTICS"), etc.), a deterministic annealing clustering technique, etc. For example, a graph (e.g., a collaborative filtering graph, etc.) may be evaluated in order to determine various subsets or clusters included in the graph. Respective common lists of keywords may then be determined for each of the subsets. A total number of identified common keywords may then be calculated across all of the subsets. The total number of keywords may then be utilized to determine a number of topics, groups, or centers to be evaluated during the performance of a latent Dirichlet allocation ("LDA") or other suitable clustering technique. For example, a number of LDA topics for evaluating and forming clusters associated with an electronic catalog may be determined.

As another example of generating a suggestion, information associated with items identified by a user 102 may be collected and/or determined. A common set of keywords may then be determined for the items, and a topic that the user 102 is interested in may be determined for making recommendations (e.g., recommendations of similar items, etc.) based at least in part upon an analysis of the common set of keywords. In certain instances, the topic may be determined based upon an intersection between topics in which the items are classified. For example, the user 102 may view a snowboard that is classified in a sporting goods category, a pair of snowboard shoes classified in a shoe category, and a ski jacket classified in an outerwear category. Based upon an evaluation of a list of common keywords associated with the items, a determination may be made that the user 102 is likely interested in a snowboard category. Recommendations within the snowboard category, such as recommendations of similar items included in the snowboard category, may then be generated and presented to the user 102.

As another example of generating a suggestion, an evaluation of keywords may be utilized to make suggestions and/or recommendations associated with new items, such as new items to be added to an electronic catalog. For example, a description for a new item may be evaluated in order to determine keywords associated with the new item. The keywords for the new item may then be compared to respective lists of keywords associated with various groups of items (e.g., subsets of a graph, etc.) included in the electronic catalog. Based upon determined correspondences and/or similarities between the keywords for the new item and the keywords associated with other items, one or more topics and/or categories that best fit the new item may be determined. Suggestions and/or recommendations may then be made based at least in part upon the determined topics and/or categories. In this regard, suggestions and/or recommendations may be made for new items without waiting to collect historical information (e.g., viewing information, rating information, purchase information, etc.) associated with the new items. Other types of suggestions may be generated by the suggestion module 138 as desired. The described suggestion are provided by way of example only.

As noted above, in some aspects, the architecture 100 may also include one or more service provider computers 110. The service provider computers 110 may include any types of computing devices such as, but not limited to, mobile, desktop, thin-client, server, and/or cloud computing devices. In some examples, the service provider computers 110 may be in communication with the user devices 104 and/or the suggestion/recommendation service computers 112 via the networks 108, or via other network connections. In certain embodiments, the service provider computers 110 may include one or more servers, perhaps arranged in a cluster, as a server farm, or as individual servers not associated with one another. These servers may be configured to host a website 106 (or combination of websites) viewable via the user devices 104 and/or any suitable user application 115 (e.g., a Web browser, a dedicated application, etc.) accessible by any number of users 102. Additionally, in some aspects, the service provider computers 110 may be configured to generate graphs, perform keyword analyses, and/or to generate suggestions as part of an integrated, distributed computing environment.

In one illustrative configuration, the service provider computers 110 may include at least one memory 140 and one or more processing units (or processor(s)) 142. The processor(s) 142 may be implemented as appropriate in hardware, software, firmware, or combinations thereof. Various implementations of the processor(s) 142 may include computer-executable or machine-executable instructions written in any suitable programming language to perform the various functions described. As a result of executing computer-executable instructions, the service provider computers 110 may form special-purpose computers or particular machines configured to host and/or provide website and/or other network-based functionality to users 102. Additionally, the service provider computers 110 may be configured to provide user information, user account information, user event data, item description data, and/or other data to the suggestion/recommendation service computers 112 for evaluation.

The memory 140 may store program instructions that are loadable and executable on the processor(s) 142, as well as data generated during the execution of these programs. Depending on the configuration and type of service provider computers 110, the memory 140 may be volatile (such as random access memory ("RAM")) and/or non-volatile (such as read-only memory ("ROM"), flash memory, etc.). The service provider computers 110 or servers may also include additional storage 144, which may include removable storage and/or non-removable storage. The additional storage 144 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 140 may include multiple different types of memory, such as static random access memory ("SRAM"), dynamic random access memory ("DRAM"), or ROM.

The memory 140 and/or the additional storage 144, both removable and non-removable, are all examples of computer-readable storage media. For example, computer-readable storage media may include volatile and non-volatile, removable and non-removable media implemented in any method or technology for storage of information such as computer-readable instructions, data structures, program modules, or other data. The memory 140 and the additional storage 144 are all examples of computer-readable storage media.

The service provider computers 110 may also contain communications connection(s) 146 that allow the service provider computers 110 to communicate with a stored database, another computing device or server, user terminals, and/or other devices on the networks 108. The service provider computers 110 may also include input/output ("I/O") device(s) 148, such as a keyboard, a mouse, a pen, a voice input device, a touch input device, a display, speakers, a printer, etc., that facilitate user interaction with the service provider computers 110.

Turning to the contents of the memory 140 in more detail, the memory 140 may include an operating system ("OS") 150 and one or more application programs or services for implementing the features disclosed herein including a user application module 152 and/or an account management module 154. The OS 150 may include one or more suitable applications and/or program modules that facilitate the general operation of the service provider computers 110, as well as the execution of one or more of the additional application programs. The user application module 152 may include one or more suitable applications and/or modules configured to generate, host, or otherwise provide the website 106 to users 102.

In some examples, the account management module 154 may be configured to maintain, or otherwise store, account information associated with one or more requested accounts. The account information may include account holder information, a user ID, a password, acceptable answers to challenge questions, etc. In this regard, users 102 may be authenticated when accessing and/or utilizing the website.

Additionally, during operation, the user application module 152 may collect and/or track information associated with various user events and/or actions (e.g., clicks, reviews, ratings, etc.) associated with items. In certain embodiments, the collected information may be stored in memory 140 and/or any number of suitable databases for subsequent evaluation by the service provider computers 110 and/or the suggestion/recommendation service computers 112. In other embodiments, the collected information may be communicated to the suggestion/recommendation service computers 112 for evaluation and/or storage.

Further, the architecture 100 may include one or more user devices 104(1)-(N). The user devices 104 may include any types of computing devices such as, but not limited to, mobile phones, smart phones, personal digital assistants ("PDA"), laptop computers, desktop computers, thin-client devices, tablet PCs, etc. In some examples, the user devices 104 may be in communication with the service provider computers 110 via the networks 108, or via other network connections.

A user device 104 may include components similar to those described above for the service provider computers 110 and/or the suggestion/recommendation service computers 112. For example, in one illustrative configuration, the user devices 104 may include at least one memory 156 and one or more processing units (or processor(s)) 158. The processor(s) 158 may be implemented as appropriate in hardware, software, firmware, or combinations thereof. Various implementations of the processor(s) 158 may include computer-executable or machine-executable instructions written in any suitable programming language to perform the various functions described. As a result of executing computer-executable instructions, a special-purpose computer or particular machine may be formed that facilitates interaction with the website 106, the provision of user data (e.g., selection data, interaction data, rating data, review data, etc.) to other components of the architecture 100, and/or the receipt of information associated with generated recommendations.

The memory 156 may store program instructions that are loadable and executable on the processor(s) 158, as well as data generated during the execution of these programs. Depending on the configuration and type of user device 104, the memory 156 may be volatile (such as random access memory ("RAM")) and/or non-volatile (such as read-only memory ("ROM"), flash memory, etc.). The user device 104 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 156 may include multiple different types of memory, such as static random access memory ("SRAM"), dynamic random access memory ("DRAM"), or ROM.

Turning to the contents of the memory 156 in more detail, the memory 156 may include an operating system ("OS") and one or more application programs or services for implementing the features disclosed herein, including at least a user application 115, such as a Web browser or dedicated software application (e.g., a smart phone application, a tablet application, etc.). The OS may include one or more suitable applications and/or program modules that facilitate the general operation of the user device 104, as well as the execution of one or more of the additional application programs. The user application 115 may be configured to receive, store, and/or display a website 106 for interacting with the service provider computers 110. Additionally, as noted above, the memory 156 may store a GUI 116 for displaying the website 106 to the user 102. Additionally, the user application 115 may facilitate the ability of the user 102 to interact with the items 118 by performing actions, occurrences, or events 160 on or with the items 118. For example, and without limitation, events 160 may include making a purchase 162 of the item, streaming 164 the item, rating 166 the item, etc. As noted above, in some aspects, each event 160 (which also includes reviewing an item or user, clicking a link associated with an item or user, adding an item to a wish list, adding an item to a cart, etc.) may indicate, to the graphing module 134 of the suggestion/recommendation service computers 112 or to an appropriate component or module of the service provider computers 110, that an edge between two nodes in a graph should be added, that a count associated with an edge should be incremented, or that a count associated with an edge should be increased or decreased by a particular factor. Similarly, in some aspects, each event 160 may indicate that an item associated with the event should be included in a group of related or potentially related items for purposes of a keyword analysis.

Additional types of computer storage media that may be present in the service provider computers 110 and/or the suggestion/recommendation service computers 112 may include, but are not limited to, programmable random access memory ("PRAM"), SRAM, DRAM, RAM, ROM, electrically erasable programmable read-only memory ("EEPROM"), flash memory or other memory technology, compact disc read-only memory ("CD-ROM"), digital versatile discs ("DVD") or other optical storage, magnetic cassettes, magnetic tape, magnetic disk storage or other magnetic storage devices, or any other medium which can be used to store the desired information and which can be accessed by the service provider computers 110, the suggestion/recommendation service computers 112, and/or other computing devices. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

Illustrative Tools

Figure 2:
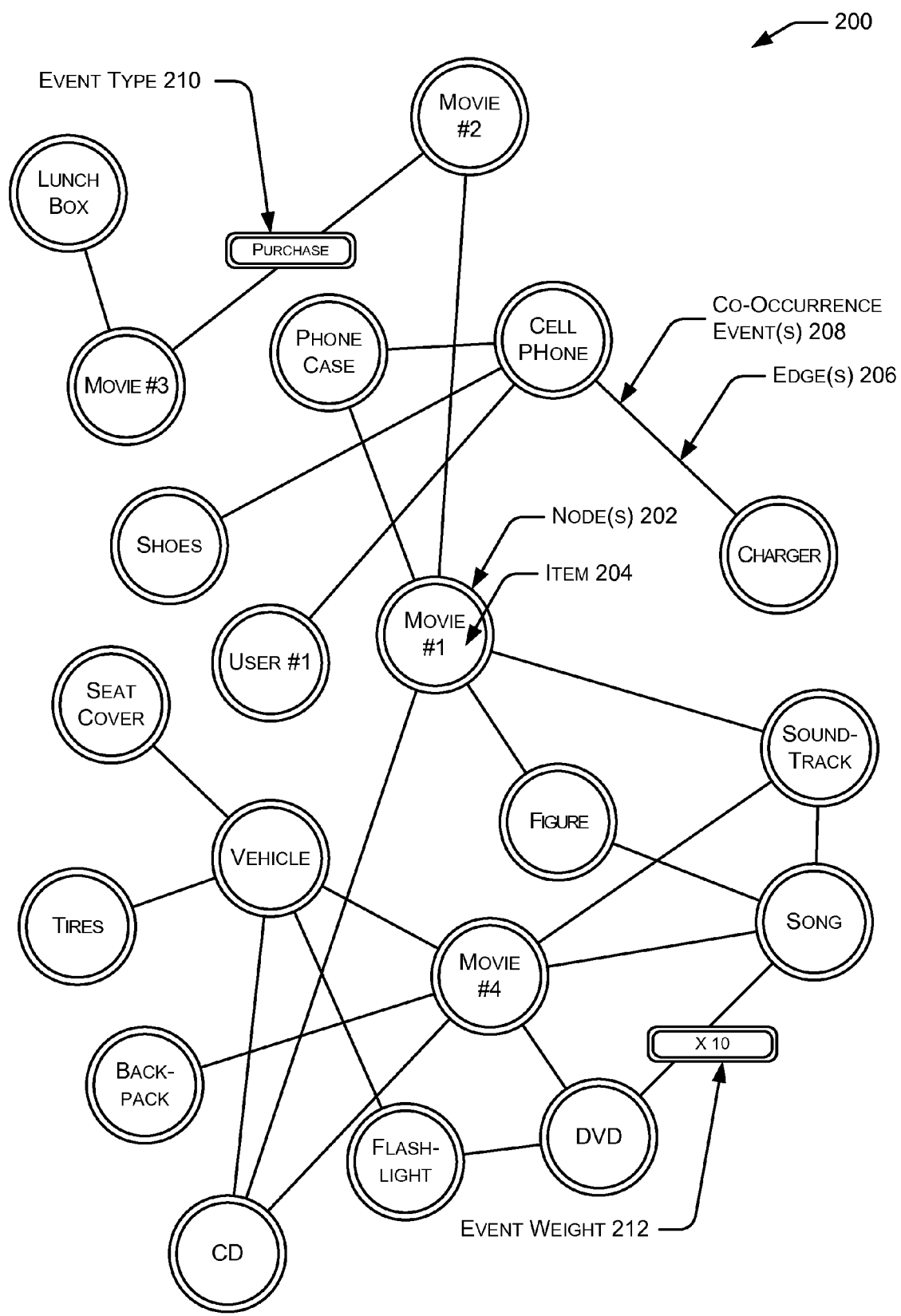
FIGS. 2 and 3 illustrate example block diagrams representing example graphs for grouping items. Here, one or more nodes that may represent items may be connected by edges that may represent co-occurred events.

As set forth above, a wide variety of different types of graphs may be generated as desired in various embodiments. FIG. 2 depicts an illustrative graph 200 which may be generated, for example, by the suggestion/recommendation service computers 112 and/or the graphing module 134 illustrated in FIG. 1. In some aspects, the graph 200 may be constructed of nodes connected by edges as shown. However, other data structure types known in the art may also be utilized to represent similar relationships between items. In this example, the graph 200 displays several nodes 202 that represent one or more items, such as item 204. In this example, item 204 may be "Movie #1," which a user may have clicked on, viewed, rated, reviewed, purchased, etc., at some time during a web session or otherwise associated with a session ID. As noted above, in some examples, a session ID may be associated with a user or a group of users. Additionally, the session ID may be utilized to associate behavior, actions, events, occurrences, or the like over the course of a predetermined amount of time or over the life of a user account. In this regard, a graph 200 may be generated based upon current and/or historical user activity. In other embodiments, a graph may be generated based upon aggregated data associated with the activity of multiple users. For example, activity associated with various classes of users may be evaluated and utilized to generate a graph. As another example, activity data associated with various items may be evaluated (i.e., evaluated regardless of the number of users that have interacted with the item) and utilized to generate a graph. Indeed, a graph may be generated utilizing any number of different data points.

The graph 200, in this example, also displays several edges 206 connecting one or more nodes 202. Here, the edges 206 represent co-occurrence events 208 between the nodes 202 that they connect. For example, the graph 200 may be constructed with a "cell phone" node connected to a "charger" node based at least in part on one or more users rating (or purchasing, viewing, etc.) both the cell phone and the charger. As noted above, the edges 206 may further be defined by a co-occurrence count. In some aspects, a co-occurrence count may indicate how many times the co-occurred event has occurred for each node pair. For example, the edge 206 between the "cell phone" node and the "charger" node may be "one" if a single user has rated each of the paired items (i.e., the cell phone and the charger) once. Alternatively, or in addition, and by way of example only, if the user and/or other users have clicked on each of the paired items twice, rated each of them once, reviewed each of them once, and purchased both of them, the co-occurrence count may be five (i.e., the co-occurrence count may be incremented by each co-occurred event; here, twice—once each—for the two clicks and once each for the rating, reviewing, and purchasing). While event type 210 is shown as a "purchase," it will be understood that any type of event that may be performed by various users such as, but not limited to, purchasing, rating, reviewing, viewing, streaming, clicking, adding to one or more lists (e.g., wish list, shopping cart, etc.), and/or recommending to other users may be included as an event type 210.

Additionally, as noted above, different event weights 212 may be assigned to different event types 210 and/or to different factors associated with event types 210 such as, but not limited to, geographic factors, temporal factors, social networking factors, etc. By way of example only, an event weight 212 of 10 may be applied to a purchasing event, an event weight 212 of 5 may be applied to a streaming event, an event weight 212 of 2 may be applied to an item reviewing event, and an event weight 212 of 1 may be applied to an item clicking event. Similarly, negative weights may be applied to poor ratings or reviews, events that took place some predetermined amount of time prior to the current date and/or time, returns, or the like. As such, a similarity score for a particular edge 206 may indicate more than just the number of co-occurred events for that node pair. In one non-limiting example, "Movie #1" and "Movie #2" may have been clicked on 10 times, streamed once, purchased once, and reviewed once while "Movie #3" may have been clicked on 10 times, streamed once, and reviewed once, but not purchased. As such, in this example, the similarity score for the "Movie #1"/"Movie #2" node pair may be calculated as 27 (that is, one for each click=10, five for each stream=5, ten for each purchase=10, and two for each review=2; 10+5+10+2=27). However, the similarity score for the "Movie #1"/"Movie #3" node pair may only be calculated as 17 (that is, because Movie

3 was never purchased, and its co-occurrence count does not include a factor of ten for a purchase event). In yet another example, with similar hypothetical details, "Movie #1" may have been purchased a certain time before "Movie #2." In some aspects, this may give less weight to the purchase event. That is, the greater time distance of events, the less the event weight 212 may impact the co-occurrence account. For example, if the purchase was more than a year prior to the next purchase, the event weight 212 may be 8 rather than 10; thus, decreasing the similarity score and indicating less of a similarity between the two items 204. As desired, other weighting variations may be used as well.

Figure 3:
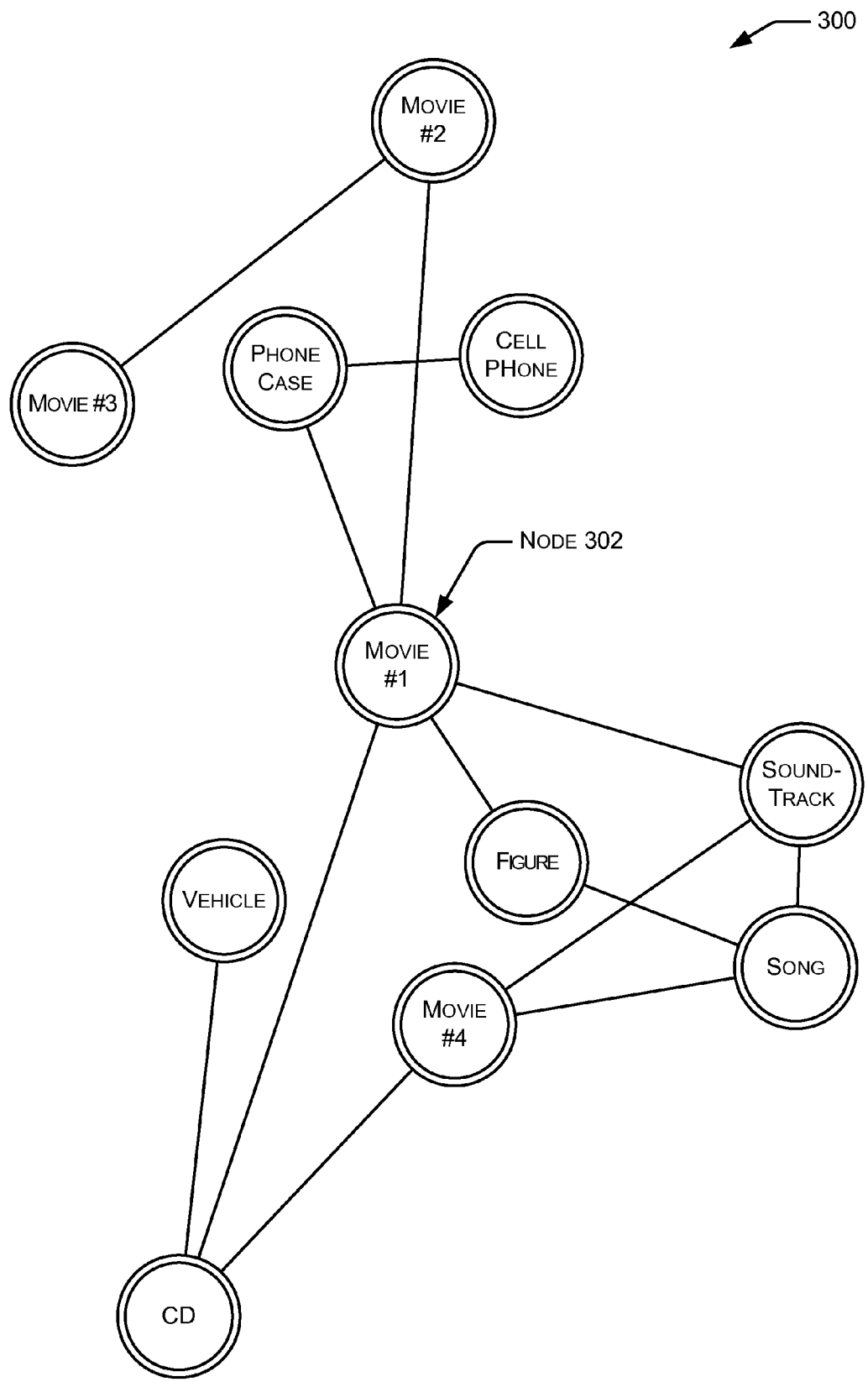

Further, once a graph 200 is generated, the graphing module 134 of FIG. 1 may determine any number of subset graphs and/or clusters that may be evaluated utilizing keyword analysis techniques. FIG. 3 depicts an illustrative subset graph 300 which may be generated and/or utilized for further implementing the graphing and/or suggestion techniques described above. By way of example only, the subset graph 300 of FIG. 3 may have been generated using a multi-hop, k closest nodes, shortest distance algorithm, where k=2 and where the starting node is "Movie #1," or node 302. In this way, the algorithm make take multiple hops into account and may find all nodes within two hops of node 302.

In some aspects, the starting node, for running the shortest distance algorithm, may be determined by the suggestion/recommendation service computers 112 based on an event or action of a user utilizing the website 106 of FIG. 1. For example, upon a user 102 requesting to view "Movie #1," clicking on a link to "Movie #1," rating or reviewing the movie, or the like, the graphing module 134 of FIG. 1 may begin at the node associated with "Movie #1" of the graph 200 of FIG. 2 in order to generate the subset graph 300. The graphing module 134 may then generate the subset graph 300 based on the determined k value. In this example, k=2; however, in other examples, k may be as large or as small as desired based, in part, on the product category, the domain space, and/or the computational power of the suggestion/recommendation service computers 112 and/or the service provider computers 110. In other aspects, the starting node may be determined by the service provider computer 110 and/or the suggestion/recommendation service computers 112 in the absence of specific user events or actions. For example, starting nodes for various subsets may be determined in an attempt to cluster an electronic catalog.

Illustrative Processes

FIGS. 4-7 illustrate example flow diagrams of example processes 400, 500, 600, 700 for enabling the building of suggestions based upon an evaluation of keywords associated with the items. These processes are illustrated as logical flow diagrams, each operation of which represents one or a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes. Additionally, the described processes may be performed by any number of suitable architectures and/or associated components, such as the architecture 100 and associated service provider computers 110 and/or suggestion/recommendation service computers 112 illustrated in FIG. 1.

Figure 4:
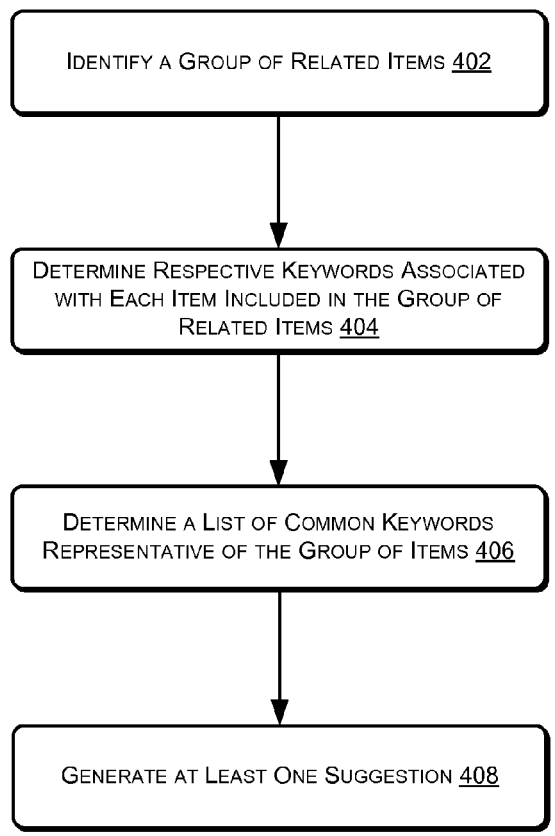
FIGS. 4-7 illustrate example flow diagrams of example processes for enabling the building of suggestions based upon an evaluation of keywords associated with the items.

Turning first to FIG. 4, an example process 400 for generating at least one suggestion based upon an evaluation of related items is illustrated. The process 400 may begin by identifying a group of related items at block 402. A wide variety of different processes and/or techniques may be utilized to identify a group of related items. For example, a graph of related items (e.g., a collaborative filtering graph, a content-based graph, a hybrid graph, etc.) may be generated. A generated graph may include items and connections, such as co-occurrences, between the items. In certain embodiments, a graph may be identified as a group of related items. In other embodiments, one or more subsets of the graph may be identified as groups of related items. For example, one or more subsets of the items may then be identified from a graph utilizing any number of suitable algorithms, such as a multi-hop, shortest path algorithm. As another example of identifying related items, one or more groups of related items may be determined based upon an analysis of received item indications associated with a consumer or user, such as item selections, item ratings, item views, etc. In this regard, a group of related items relevant to the consumer may be identified.

Once one or more groups of related items have been identified, operations may continue at block 404. At block 404, respective keywords associated with each of the items included in a group of related items may be determined. Additionally or alternatively, at block 406, a list of common keywords representative of the group of related items may be determined. In certain aspects, description data associated with the items may be evaluated in order to determine keywords for the items and/or common keywords for the group of related items. Any number of suitable information extraction techniques, such as LSA and/or TF-IDF analysis, may be utilized to evaluate description information in order to identify respective keywords for the items and/or a list of common keywords for a group of related items. Additionally, as desired, certain keywords may be weighted and/or other terms included in the description data (e.g., relatively common terms such as "a," "the," etc.) may be filtered out. In certain embodiments, a list of common keywords may be determined for a single group of related items. In other embodiments, a respective list of common keywords may be determined for each of multiple groups of related items (e.g., multiple subsets identified from a graph, etc.).

The list(s) of common keywords may then be utilized at block 408 to make a wide variety of different types of suggestions, such as clustering suggestions and/or suggestions for topics associated with the items. As one example suggestion, a total number of keywords across multiple groups of items may be calculated and utilized to determine a number of topics or groups to be utilized for a clustering technique for evaluating an electronic catalog or other grouping of items (e.g., a group of users or consumers). A number of topics or groups may be determined for a wide variety of different types of clustering techniques, such as an LDA analysis, a canopy clustering technique, a hierarchical clustering technique, a centroid-based clustering technique, a distribution-based clustering technique, a density-based clustering technique, a deterministic annealing clustering technique, etc. As another example suggestion, a topic that a user or consumer is interested in may be determined utilizing a list of common keywords. For example, a consumer may view multiple items, such as items that may initially be classified in different categories. Based upon an evaluation of a list of common keywords associated with the items, a relevant topic that encompasses the items and/or that intersects the initial category classifications may be determined. Recommendations within the determined category may then be generated and presented to the consumer, such as recommendations of similar items.

Additionally, in certain embodiments, an evaluation of keywords may be utilized to make suggestions and/or recommendations associated with new items, such as new items to be added to an electronic catalog. For example, a description for a new item may be evaluated in order to determine keywords associated with the new item. The keywords for the new item may then be compared to respective lists of keywords associated with groups of items (e.g., subsets of a graph, etc.) included in the electronic catalog. Based upon determined correspondences and/or similarities between the keywords for the new item and the keywords associated with other items, one or more topics and/or categories that best fit the new item may be determined. Suggestions and/or recommendations may then be made based at least in part upon the determined topics and/or categories. In this regard, suggestion and/or recommendations may be made for new items without waiting to collect historical information (e.g., viewing information, rating information, purchase information, etc.) associated with the new items.

Figure 5:
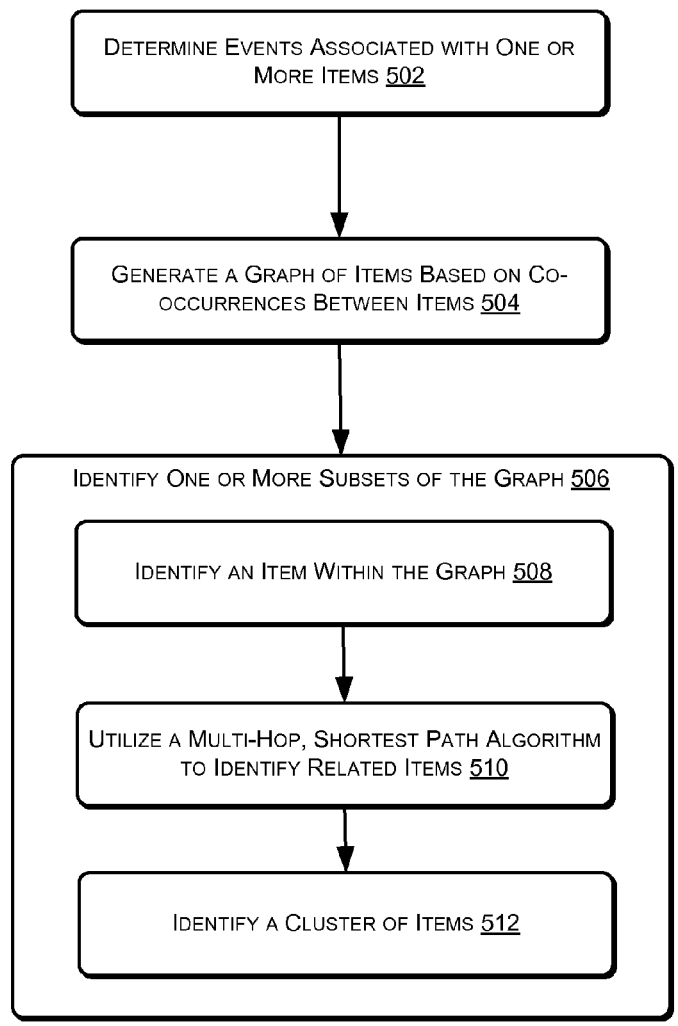

FIG. 5 illustrates an example flow diagram of process 500 for generating a graph of items, such as a collaborative filtering graph or a content-based graph. The generation of a graph and/or the evaluation of a graph may be utilized to identify related items for a keyword analysis. With reference to FIG. 5, the process 500 may begin at block 502. At block 502, any number of events associated with one or more items may be determined. The one or more items may include items for sale in a catalog, items in a list, items for rent, items for viewing, reviewing, and/or rating, as well as for users, groups of users, systems, and the like. Additionally, as noted above, events may include, but are not limited to, purchasing, viewing, streaming, reviewing, rating, clicking, consuming, adding to groups or lists (e.g., a favorites list, a wish list, a shopping cart, etc.), and/or any number of other events associated with consumer and/or user interactions with items. At block 504, the process 500 may generate a graph of items. As noted above, the graph may be a content-based graph, a collaborative filtering graph, or a hybrid graph. Further, the graph may include nodes that represent items and edges that represent co-occurred events between the items.

In some examples, at block 506, the process 500 may then determine one or more subsets or clusters of related items within the graph. A wide variety of suitable techniques may be utilized to identify a subset of the graph. For example, at block 508, an item or node within the graph may be identified as an initial node or a starting node. At block 510, a multi-hop, shortest path algorithm may be utilized to identify or determine any number of additional nodes (e.g., the closest nodes that satisfy a distance threshold from the initial node, etc.) within a predetermined distance of the first node. In this regard, a subset or cluster of items may be determined or identified from the graph at block 512. In certain embodiments, the identification of a subset of a graph may be utilized to reduce the computational complexity associated with conducting a keyword analysis and generating suggestions for a user or consumer. In other embodiments, multiple subsets or clusters may be identified from the graph, and keyword analyses may be performed on each of the subsets.

Figure 6:
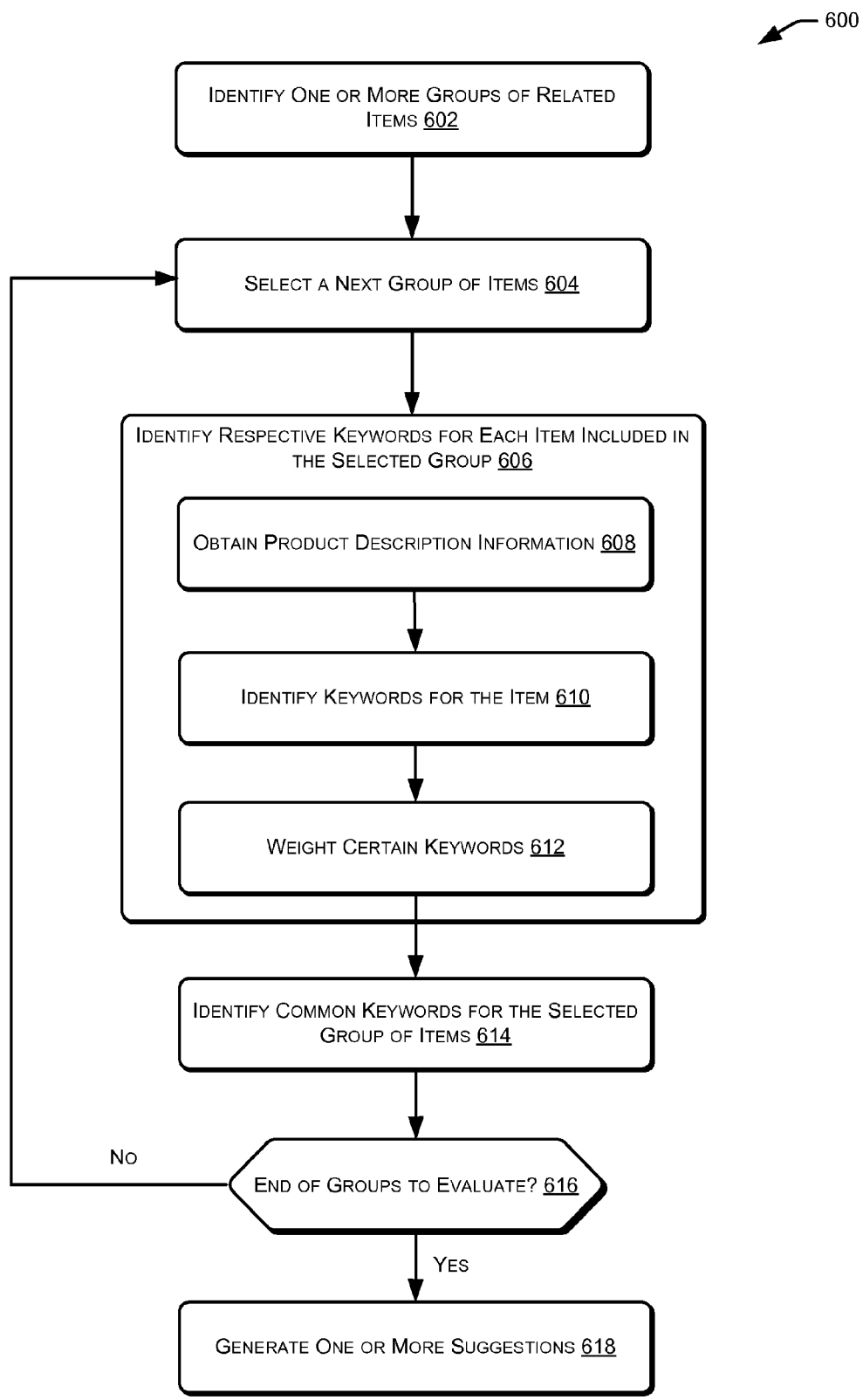

FIG. 6 illustrates an example flow diagram of process 600 for conducting a keyword analysis on one or more groups of related items. The process 600 may begin by identifying one or more groups of related items at block 602. As described in greater detail above, a wide variety of different processes and/or techniques may be utilized to identify groups of related items. For example, a graph of related items (e.g., a collaborative filtering graph, a content-based graph, a hybrid graph, etc.) may be generated. As another example, one or more groups of related items may be determined based upon an analysis of received item indications associated with a consumer or a user, such as item selections, item ratings, item views, etc.

At block 604, a next group of related items may be selected for analysis and/or evaluation. Respective keywords for each item included in the selected group of related items may then be identified or determined at block 606. A wide variety of suitable methods and/or techniques may be utilized to identify respective keywords for each item included in the group. For example, at block 608, product description information for each of the items (or for a portion of the items) may be obtained from any number of suitable sources, such as internal memory, external memory, and/or an external data source. At block 610, the product description information for the items may be evaluated utilizing any number of suitable information extraction and/or evaluation techniques (e.g., latent semantic analysis, TF-IDF analysis, etc.) in order to identify keywords representative of each of the items. Additionally, at block 612, one or more keywords may be weighted as desired. For example, with a movie, a keyword associated with a movie genre may be provided a greater weight than other keywords. As another example, with clothing or apparel, a keyword associated with a style may be provided a greater weight than other keywords.

At block 614, common keywords (e.g., a list of common keywords, etc.) may be identified for the selected group of items. A wide variety of suitable methods and/or techniques may be utilized as desired to identify common keywords for the selected group. For example, keywords for each of the items may be compared in order to identify common keywords for the group of items. As another example, a TF-IDF analysis or other information extraction and/or evaluation technique may be performed in order to identify common keywords for the selected group of items. In certain embodiments, a TF-IDF analysis (or other analysis) may be performed on the description data for the items in order to identify a list of common keywords. As desired, the list of common keywords may be identified in parallel with the identification of keywords for each item.

At block 616, a determination may be made as to whether the end of the one or more groups of items has been reached. If it is determined at block 616 that the end of the groups has not been reached, then operations may continue at block 604, and a next group of items may be selected for evaluation. If, however, it is determined at block 616 that the end of the groups has been reached, then operations may continue at block 618, and one or more suggestions may be generated based at least in part upon the identified keywords, list of common keywords, and/or other information associated with the group(s) of related items.

Figure 7:
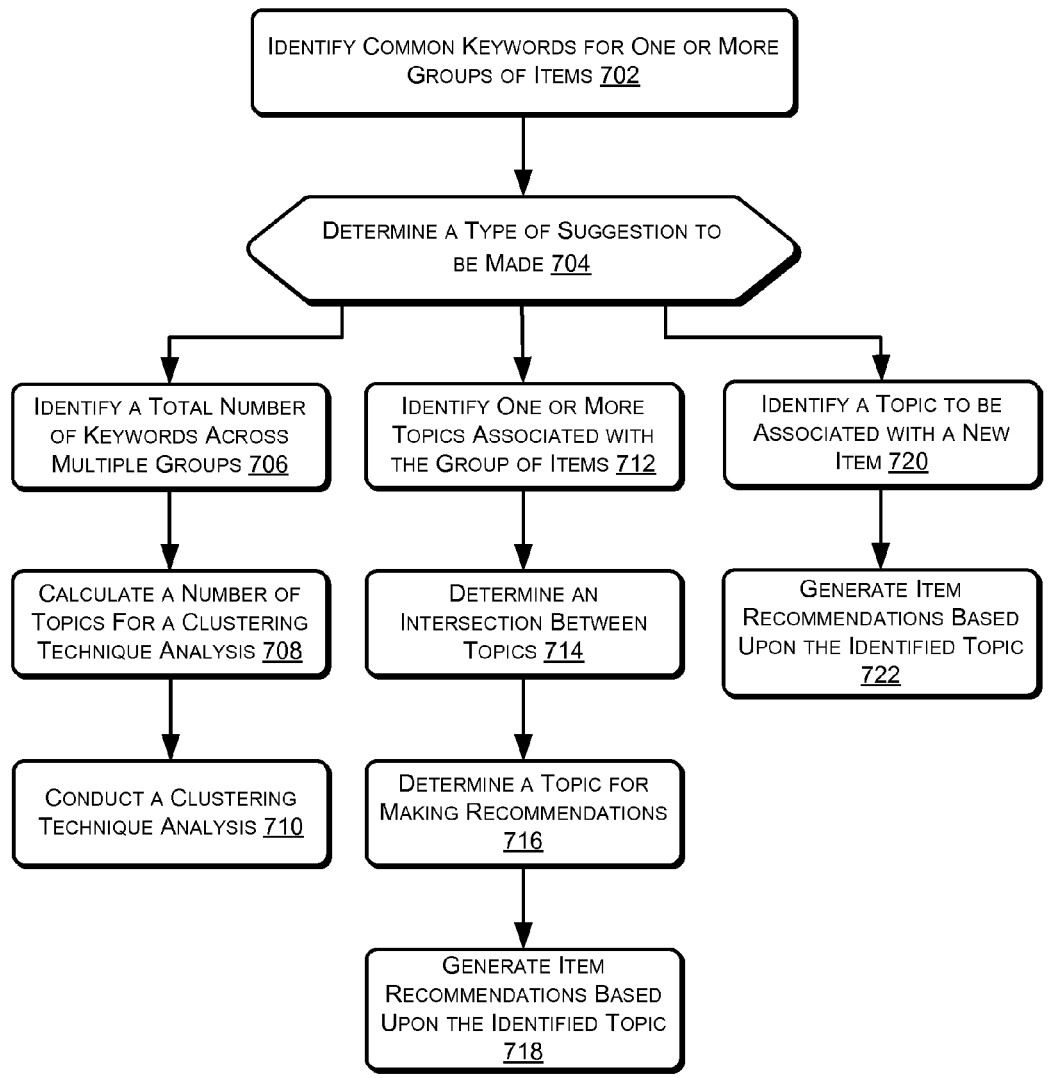

FIG. 7 illustrates an example flow diagram of process 700 for generating suggestions based at least in part upon the results of a keyword analysis performed on a group of related items, such as a group of related items identified from a generated graph (e.g., a collaborative filtering graph, etc.). The process 700 may begin at block 702, where common keywords (e.g., list(s) of common keywords, etc.) may be identified for one or more groups of items. For example, common keywords may be identified utilizing the operations described in the process 600 of FIG. 6.

At block 704, a determination of a type of suggestion to be made or generated may be identified or determined. A wide variety of different types of suggestions may be generated as desired in various embodiments. A few example types of suggestions are described with continued reference to FIG. 7; however, the described suggestions are not intended to be limiting and are provided by way of example only. As one example, if it is determined at block 704 that a suggestion concerning a number of topics or groups to utilize for a clustering technique or analysis (e.g., an LDA analysis, a canopy clustering technique, a hierarchical clustering technique, a centroid-based clustering technique, a distribution-based clustering technique, a density-based clustering technique, a deterministic annealing clustering technique, etc.) should be generated, then operations may continue at block 706.

At block 706, a total number of keywords across multiple groups of items may be calculated. For example, lists of common keywords for multiple groups of items or clusters (e.g., subsets of a graph, etc.) may be summed or otherwise processed in order to calculate a total number of keywords. At block 708, a number of topics or groups to be utilized for a clustering technique, such as an LDA analysis of an electronic catalog, may be calculated based at least in part upon the total number of keywords. At block 710, a clustering technique (e.g., an LDA analysis, etc.) may then be performed or conducted utilizing the determined number of topics. As a result of the keyword analysis, a relatively accurate clustering and/or clustering analysis may be conducted. Additionally, as desired, the clustering technique and/or clustering analysis may be repeated and/or performed on a periodic basis, such as once a day, etc.

As another example suggestion, if it is determined at block 704 that suggestions will be performed based upon an identified topic that a user may be interested in, then operations may continue at block 712. At block 712, one or more topics associated with an identified group of items (e.g., a group of items associated with user actions, etc.) may be identified. For example, keywords associated with the items may be evaluated in order to identify topics for the various items. An intersection between the topics may then be determined at block 714 in order to identify a topic for making recommendations and/or other suggestions at block 716. Alternatively, keywords associated with the various items and/or a list of common keywords may be evaluated in order to identify the topic for making suggestions and/or recommendations. As an example, if a user views a snowboard classified in a sporting goods category and a ski jacket classified in an apparel category, then a list of common keywords for the items may be evaluated in order to determine that the user is interested in snowboarding equipment, and a snowboard category may be determined. Once a topic has been determined for making suggestions and/or recommendations, any number of item recommendations may be generated and presented at block 718. Utilizing the example above, one or more recommendations for additional snowboarding items may be generated.

As yet another example suggestion, if it is determined at block 704 that a suggestions for a new item should be generated, then operations may continue at block 720. At block 720, a topic to be associated with a new item, such as a new item to be added to an electronic catalog, may be identified. For example, a description for a new item may be evaluated in order to determine keywords associated with the new item, and the keywords for the new item may be compared to keywords associated with various groups of items in order to determine one or more topics that best fit the new item. At block 722, suggestions and/or recommendations may then be generated based at least in part upon the determined topic(s) to be associated with the new item. For example, recommendations for similar items may be made. In this regard, suggestions and/or recommendations may be made for new items without waiting to collect historical information (e.g., viewing information, rating information, purchase information, etc.) associated with the new items.

The operations described and shown in the methods and/or processes 400, 500, 600, 700 of FIGS. 4-7 may be carried out or performed in any suitable order as desired in various embodiments. Additionally, in certain embodiments, at least a portion of the operations may be carried out in parallel. Furthermore, in certain embodiments, less than or more than the operations described in FIGS. 4-7 may be performed.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some embodiments.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, certain embodiments may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system, comprising:
   at least one memory configured to store computer-executable instructions;
   at least one processor configured to access the at least one memory and execute the computer-executable instructions to:
      generate a collaborative filtering graph comprising:
         a plurality of nodes, wherein a node corresponds to an item offered in an electronic catalog; and
         a plurality of edges, wherein an edge connects a pair of nodes of the plurality of nodes that have at least one co-occurred user interaction;
      determine, based at least in part on the plurality of edges, a subset of the plurality of nodes of the collaborative filtering graph that are related;
      determine, for each of at least two nodes of the subset, a list of keywords comprising one or more keywords from a description associated with the item corresponding to the node;
      determine, based at least in part on evaluation of the keywords determined for the at least two nodes of the subset, a list of common keywords comprising one or more keywords shared by the lists of keywords for the at least two nodes of the subset, wherein the subset is smaller than a whole set of the plurality of nodes; and
      generate, based at least in part upon the determined list of common keywords, at least one suggestion.

2. The system of claim 1, wherein a respective list of common keywords is determined for a plurality of subsets of the plurality of nodes, and wherein the at least one processor is configured to generate at least one suggestion by executing the computer-executable instructions to:
   determine a total number of keywords associated with the plurality of subsets; and
   calculate, based at least in part upon the total number of keywords, a number of topics for a clustering technique.

3. The system of claim 1, wherein the at least one suggestion comprises a suggestion of a topic associated with the items corresponding to the subset of the plurality of nodes.

4. The system of claim 1, wherein the list of common keywords is determined based at least in part upon a term frequency-inverse document frequency analysis.

5. The system of claim 1, wherein the at least one processor is further configured to execute the computer-executable instructions to determine the subset of the plurality of nodes utilizing a multi-hop, shortest path algorithm.

6. A method, comprising:
   under control of one or more computer systems configured with executable instructions,
   identifying a plurality of related items of a graph, the graph comprising:
      a plurality of items offered in an electronic catalog; and
      a plurality of edges, wherein an edge connects a pair of items that have at least one co-occurred user interaction, and
      wherein the identifying is based at least in part on the plurality of edges;
   determining, for each of two or more items of the plurality of related items, a list of keywords comprising one or more keywords from a description associated with the item;
   determining, based at least in part upon an evaluation of the list of keywords for the two or more items of the plurality of related items, a list of common keywords comprising one or more keywords shared by the lists of keywords for the two or more items of the plurality of related items; and
   generating, based at least in part upon the determined list of common keywords, at least one suggestion.

7. The method of claim 6, wherein identifying a plurality of related items of a graph comprises generating the graph.

8. The method of claim 7, wherein generating the graph comprises generating one of a collaborative filtering graph, a content-based graph, or a hybrid collaborative filtering and content-based graph.

9. The method of claim 7, wherein an edge is based at least in part upon co-occurrence counts between the pair of items connected by the edge.

10. The method of claim 6, wherein identifying a plurality of related items comprises identifying the related items utilizing a multi-hop, shortest path algorithm.

11. The method of claim 6, wherein identifying a plurality of related items comprises identifying a plurality of items that have been identified by a user.

12. The method of claim 6, wherein generating at least one suggestion comprises calculating a number of topics for a clustering technique.

13. The method of claim 12, wherein the clustering technique comprises one of a latent Dirichlet allocation, a k-means clustering technique, or a canopy clustering technique.

14. The method of claim 12, wherein the plurality of related items comprises a first plurality of related items, the list of common keywords comprises a first list of common keywords, and further comprising:
   identifying a second plurality of related items;
   determining, for each of two or more items of the second plurality of related items, a list of keywords comprising one or more keywords associated with the item;
   determining, based upon an evaluation of the one or more keywords for the two or more items of the second plurality of related items, a second list of common keywords comprising one or more keywords shared by the lists of keywords for the two or more items of the second plurality of related items;
   determining, based at least in part upon the first list of common keywords and the second list of common keywords, a total number of keywords; and
   calculating the number of topics based at least in part upon the total number of keywords.

15. The method of claim 6, wherein generating at least one suggestion comprises:
    identifying a topic associated with the plurality of related items; and
    generating a recommendation based at least in part upon the identified topic.

16. The method of claim 15, wherein identifying a topic comprises:
    determining an intersection between a plurality of topics; and
    identifying the topic based at least in part upon the determined intersection.

17. The method of claim 6, further comprising:
    identifying information associated with a new item;
    determining, based at least in part upon the identified information, at least one keyword associated with the new item; and
    determining, based at least in part upon the at least one keyword, that the new item is related to the plurality of related items.

18. The method of claim 6, wherein determining a list of common keywords comprises determining a list of shared keywords that are present in each of the lists of keywords for the two or more items of the plurality of related items.

19. The method of claim 6, wherein determining a list of common keywords comprises determining a list of common keywords based at least in part upon a term frequency-inverse document frequency analysis the lists of keywords for the two or more items of the plurality of related items.

20. The method of claim 6, wherein determining a list of keywords for an item comprises determining one or more keywords based at least in part upon an evaluation of a description data for the item stored in memory.

21. The method of claim 6, wherein determining a list of keywords for an item comprises weighting at least one of the one or more keywords.

22. The method of claim 6, wherein the at least one of the plurality of related items comprises one of digital content, an identifier of physical content, or an identifier of a user.

23. The method of claim 22, wherein the digital content comprises content stored in at least one memory and provided for sale or rent from a catalog.

24. The method of claim 22, wherein the physical content comprises an item for sale in a catalog.

25. One or more non-transitory computer-readable media storing computer-executable instructions that, when executed by at least one processor, configure the at least one processor to:
    generate a collaborative filtering graph comprising:
        a plurality of nodes, wherein a node corresponds to an item offered in an electronic catalog; and
        a plurality of edges, wherein an edge connects a pair of nodes of the plurality of nodes that have at least one co-occurred user interaction;
    determine, based at least in part on the plurality of edges, a subset of the plurality of nodes of the collaborative filtering graph that are related;
    determine, for each of at least two nodes of the subset, a list of keywords comprising one or more keywords from a description associated with the item corresponding to the node;
    determine, based at least in part on evaluation of the keywords determined for the at least two nodes of the subset, a list of common keywords comprising one or more keywords shared by the lists of keywords for the at least two nodes of the subset, wherein the subset is smaller than a whole set of the plurality of nodes; and
    generate, based at least in part upon the determined list of common keywords, at least one suggestion.

26. The computer-readable media of claim 25, wherein a respective list of common keywords is determined for a plurality of subsets of the plurality of nodes, and wherein the computer-executable instructions further configure the at least one processor to:
    determine a total number of keywords associated with the plurality of subsets; and
    calculate, based at least in part upon the total number of keywords, a number of topics for a clustering technique.

27. The computer-readable media of claim 25, wherein the at least one suggestion comprises a suggestion of a topic associated with the items corresponding to the subset of the plurality of nodes.

28. The computer-readable media of claim 25, wherein the list of common keywords is determined based at least in part upon a term frequency-inverse document frequency analysis.

29. The computer-readable media of claim 25, wherein the computer-executable instructions further configure the at least one processor to determine the subset of the plurality of nodes utilizing a multi-hop, shortest path algorithm.

* * * * *